United States Patent [19]

Löffler

[11] 3,979,290

[45] Sept. 7, 1976

[54] APPARATUS AND PROCESS FOR CONTROLLING AND REGULATING THE FREEDOM OF SUSPENDED MATTER

[75] Inventor: Friedrich Löffler, Bruhl, Germany

[73] Assignee: Deutsche Gold- und Silber-Scheideanstalt vormals Roessler, Germany

[22] Filed: Nov. 25, 1975

[21] Appl. No.: 635,267

[30]   Foreign Application Priority Data

Nov. 27, 1974   Germany............................ 2456011

[52] U.S. Cl................................. 210/83; 210/96 R; 210/534
[51] Int. Cl.²......................................... B01D 21/24
[58] Field of Search................. 210/83, 84, 96, 534

[56]   References Cited
UNITED STATES PATENTS

| | | | |
|---|---|---|---|
| 3,616,925 | 11/1971 | Tolman............................ | 210/534 X |
| 3,618,766 | 11/1971 | Morey............................. | 210/96 X |
| 3,834,128 | 9/1974 | Gardiner......................... | 210/96 X |
| 3,878,094 | 4/1975 | Conley et al..................... | 210/96 |

*Primary Examiner*—John Adee
*Attorney, Agent, or Firm*—Cushman, Darby & Cushman

[57]   ABSTRACT

There is provided an apparatus for automatically controlling and regulating the freedom from suspended matter of quiescent reservoir overflow liquid in mechanical separatory processes for liquid-solid phases based on the sedimentation of suspended particles in quiet or slow flowing liquids. The apparatus includes a quiet reservoir 2 below an overflow outlet 1, a withdrawal tube 6 for removal of liquid or suspension from the reservoir, a free falling interval below the outer end of the tube 6, a light ray 3 between a light source 4 and a photoelectric cell 5 arranged across the free falling interval. The tube 6 enters the reservoir at the height of the uppermost suspension material boundary level. The photocell 5 is operatively connected with the driving circuit of a slurry pump 8 connected to the outlet 12 at the bottom of the quiet reservoir 2.

There is also disclosed the process of using the apparatus.

9 Claims, 1 Drawing Figure

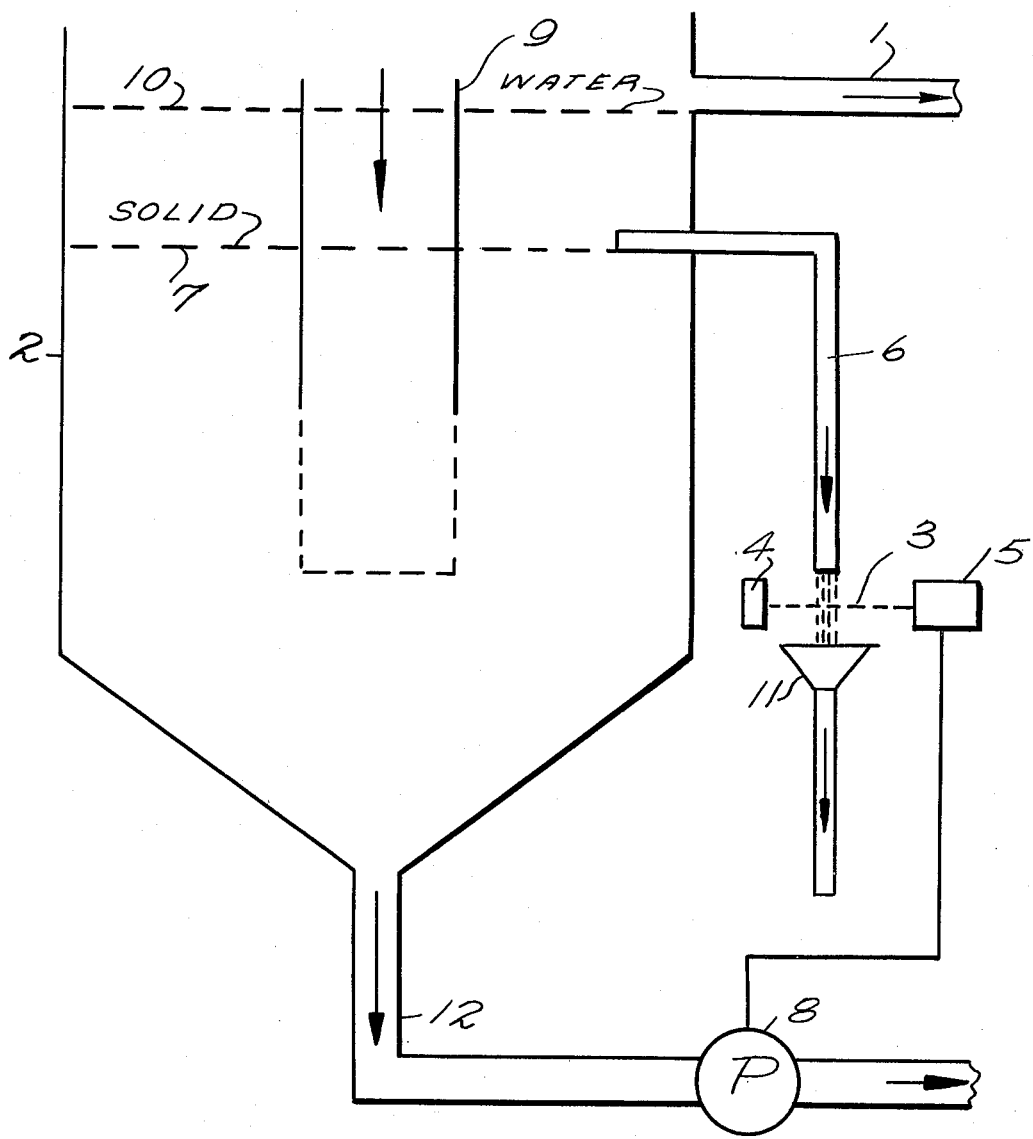

APPARATUS AND PROCESS FOR CONTROLLING AND REGULATING THE FREEDOM OF SUSPENDED MATTER

The present invention is directed to an apparatus and process for automatically controlling and regulating the freedom from suspended matter of quiescent reservoir overflow liquid in mechanical separatory processes for liquid-solid phases based on the sedimentation of suspended particles in quiet or slow flowing liquids.

There are used for separatory processes by means of which there is sought a sedimentation and concentration of solids equipment such as, for example, thickeners, sedimentation apparatus, clarification plants and conterflow washing equipment, especially Dorr counterflow washers or decantation equipment.

In this type of equipment the suspended material particles of the liquid suspension, in a given case after addition of a flocculating agent, because of their own gravitational force, settle on the bottom or in the lower part of the quiescent reservoir employed for that purpose. The velocity of flow of the liquid or suspension in such a quiescent reservoir is held so low that the settling suspended material particles are not again stirred up. The suspended material free liquid, e.g., water is removed from the quiescent reservoir via an overflow, while the settling suspended material particles are removed with suction by means of a slurry pump below the quiescent reservoir. If this pumping off does not take place timely, the layer of settling suspended material particles reaches a critical suspended material boundary level and the liquid or suspension leaves the quiescent reservoir in unclarified form by way of the overflow.

It is known for controlling and regulating the freedom from suspended material of quiescent reservoir overflow liquid in mechanical separatory processes for liquid-solid phases to arrange two photoelectric cells with the necessary light sources in different levels inside the quiescent reservoir and to connect the photocells with the electric circuit of the driving unit of the slurry pump. If the light ray to the upper photocell is interrupted by the turbidity of the liquid or suspension to be clarified, the slurry pump pumps the settling suspended particles at the lower end of the quiescent reservoir until the light ray to the lower photocell is no longer interrupted.

In this apparatus the thick liquid continuously soils the glass plates of the containers of the photocells and of the light sources whereby a continuous control of the freedom of suspended material of the quiescent reservoir overflow is made difficult or impossible, and disturbances occur in the continuous operation of the equipment, for example clarifying equipment.

The invention therefore is based on the problem of developing an apparatus and process which permits the disturbance free automatic control and regulation of the freedom from the suspended matter of the quiescent reservoir overflow liquid.

The object of the invention is the development of an apparatus for automatically controlling and regulating the freedom from suspended matter of quiescent reservoir overflow liquid in mechanical separating processes for liquid-solid phases based on settling of suspended material particles in quiet or slowly flowing liquids or suspension which is characterized by an overflow outlet for the quiescent reservoir, a withdrawal tube for withdrawal of liquid or suspension arranged below the overflow, a free falling interval below the outer end of the withdrawal tube, a light ray going between a light source and a photoelectric cell arranged across the free falling interval, the withdrawal tube entering the reservoir at the height of the uppermost suspension material boundary level. The photocell is operatively connected with the driving circuit of a slurry pump connected to the quiescent reservoir.

In the apparatus of the invention preferably the withdrawal tube for the liquid or suspension can be arranged in the side wall of the quiescent reservoir 0.1 to 0.2 meters below the overflow, whereby the withdrawal tube for liquid or suspension can be formed of a connecting pipe extending into the inside of the quiet reservoir and the withdrawal tube for liquid or suspension outside the quiet reservoir is bent downwardly. The diameter of the free falling interval after the liquid or suspension tube portion can be at least 1.5 times as large as that of the light ray.

Below the free falling interval there can be arranged a funnel with a further line or tube.

The process of controlling and regulating the freedom from suspended material of the quiescent reservoir overflow liquid using the apparatus of the invention is characterized in that a part of the liquid or suspension standing above the settling suspended material particles of a suspended material containing volume of liquid subjected to a decantation is withdrawn at the height of an uppermost suspended material boundary level and is led over a free falling interval and through an electrical regulating signal emitting light ray in accordance with the fact that as the passage of the light is diminished the pumping off of settling suspended particles is started.

The advantage of the apparatus of the invention is in the continuous maintaining of the automatic control and regulation of the freedom from suspended material of the quiescent reservoir overflow material whereby an overflow of unclarified suspension is avoided. The control elements cannot be soiled and therewith outside functions be fixed since the suspension or the liquid is controlled without contact.

A further advantage is the production of an optimally concentrated slurry since a suitable height can be reached and maintained for the slurry layer in the quiescent reservoir.

The apparatus and process of the invention not only can be used for separatory processes by means of which a settling and concentration of solids is strived for, but also for counter-current washing plants whose purpose is the washing of suspensions, i.e., the removal of soluble salts from suspension.

The single FIGURE of the drawings is a schematic illustration of the apparatus of the invention in the form of a clarification plant which is used for the removal of suspended matter particles from water.

Referring more specifically to the drawings, there is provided a quiescent reservoir 2 having an inlet line 9 for water to be clarified, an outlet 1 above the point where the water to be clarified enters the reservoir and an outlet 12 at the bottom of the reservoir. More specifically, the outlet 1 which is an overflow for the clarified water is located at the upper rim of the quiescent reservoir 2. The outlet 12 which is provided with the slurry pump for the removal of the deposited clear slurry is located at the lower end of the conical shaped quiescent reservoir.

There is arranged at the height of the suspended material boundary level 7 the liquid or suspension withdrawal tube or line 6 in the side wall 14 of the quiescent reservoir 2 about 0.2 meter below the overflow outlet 1. The liquid or suspension withdrawal line 6 is constructed of a portion 16 which projects into the inner space of the quiescent reservoir 2 and a portion outside the quiescent reservoir which is bent downwardly. Below the outer end of the withdrawal line 6 there are arranged the free falling interval and under the free falling interval the further line 18 with the funnel 11. The photoelectric cell 5 and light source 4 are so arranged at the height of the free falling interval that the light ray 3 has a point of intersection with the flowing liquid in the free falling interval after the liquid leaves the withdrawal line 6.

The photocell 5 is connected with the driving circuit of the slurry pump 8.

The process of the invention will be further explained in connection with the example.

EXAMPLE 1

The suspension to be separated from the solids, for example the suspension of an inorganic compound in water, e.g., $SiO_2$, $H_2SiO_3$, $BaSO_4$, aluminosilicates, $CaCO_3$ or pigments in a concentration of lower than 1g/l or 10,20,40,50,60,70.80,90,100 g/l or more, is added to the quiescent reservoir 2 through the inlet 9, e.g., a wire basket.

Because of the low flow rate in the quiescent reservoir the suspended material particles can settle, whereby a clear liquid remains over the precipitate. When the quiescent reservoir is filled to the level 10 the clear liquid can flow out by way of the overflow 1.

By the constant addition of the suspension of suspended matter which is to be clarified, the amount of settling suspended matter particles increases. When the layer of settling suspended matter particles reaches the suspended matter boundary level 7, the suspended matter particles flow with the clarified liquid through the liquid or suspension withdrawal line 6. They break the light ray 3 between the light source 4 (e.g., a lamp) and the photocell 5 in the free falling interval before the particles further flow into the funnel 11, whereby the slurry pump 8 which is connected with the photocell 5 is set in operation and the settling suspended matter particles are drawn off through the outlet 12 at the lower end of the quiescent reservoir 2 until the light ray 3 is no longer interrupted, i.e., until either only clear liquid or no more liquid flows through the liquid or suspension withdrawal line 6.

By the apparatus of the invention the layer of settling suspended matter particles is prevented from reaching the overflow 1. Therefore only the clear liquid flows over the overflow 1 out of the quiescent reservoir.

What is claimed is:

1. An apparatus for automatically controlling and regulating the freedom from suspended matter of quiescent reservoir overflow liquid in mechanical separatory processes for liquid-solid phases in the sedimentation of suspended particles in quiet or slow flowing liquids comprising in combination a quiescent reservoir means, overflow conduit means, the upper portion of said reservoir means for the removal of clear overflow, upper withdrawal conduit means for removing liquid or suspension from said reservoir means, said upper withdrawal conduit means having a first portion terminating in said reservoir means below said overflow conduit means and having a second portion ending outside said reservoir means, a free falling space below the end of said second portion of the upper withdrawal conduit means, a light source on one side of said free falling space, a photoelectric cell on the opposite side of the free falling space, a light ray between said light source and said photoelectric cell, said reservoir means having lower withdrawal conduit means for removing settled suspended particles, pump means connected to said lower withdrawal conduit means, means driving said pump means and means operatively connecting said photoelectric cell with said driving means whereby when suspended particles pass through said free falling space they interrupt said light ray and the photoelectric cell actuates said pump means to withdraw settled suspended particles through said lower withdrawal conduit means.

2. An apparatus according to claim 1 including conduit means for introducing liquid containing suspended matter into said reservoir means at a point below said upper withdrawal conduit means.

3. An apparatus according to claim 1 wherein the upper withdrawal conduit means enters the reservoir means in the side wall thereof.

4. An apparatus according to claim 3 wherein the upper withdrawal means is arranged 0.1 – 0.2 meters below the overflow conduit means.

5. An apparatus according to claim 3 wherein said first portion of the upper withdrawal conduit means extends into the inner space of the reservoir means.

6. An apparatus according to claim 5 wherein the second portion of the upper withdrawal conduit means extends downwardly.

7. An apparatus according to claim 3 wherein the diameter of the free falling space is at least 1.5 times as large as the light ray.

8. An apparatus according to claim 3 including funnel means below said free space to catch said liquid or suspension coming from said upper withdrawal conduit means and a further conduit means connected to said funnel means.

9. A process for controlling and regulating the freedom from suspended matter of quiescent reservoir overflow liquid wherein the reservoir is provided with an overflow conduit, an upper withdrawal conduit below said overflow conduit and a lower withdrawal conduit below said upper withdrawal conduit comprising introducing liquid containing particles of suspended matter into said reservoir below said upper withdrawal conduit and allowing said suspended matter to settle, removing clarified liquid through said overflow conduit, removing liquid through said upper withdrawal conduit and allowing it to pass through a free falling space, passing a light ray across said free falling space between a light source and a photoelectric cell, said photoelectric cell being operatively connected to a pump which in turn is connected to the lower withdrawal conduit of said reservoir whereby when the liquid passing through the free falling space contains suspended matter the light ray is cut off thereby actuating the photoelectric cell, starting the pump and removing suspended matter from the reservoir through the lower withdrawal conduit.

* * * * *